March 16, 1965  R. M. JOHNSON  3,174,025
PLASMA-JET TORCH
Filed Dec. 5, 1962
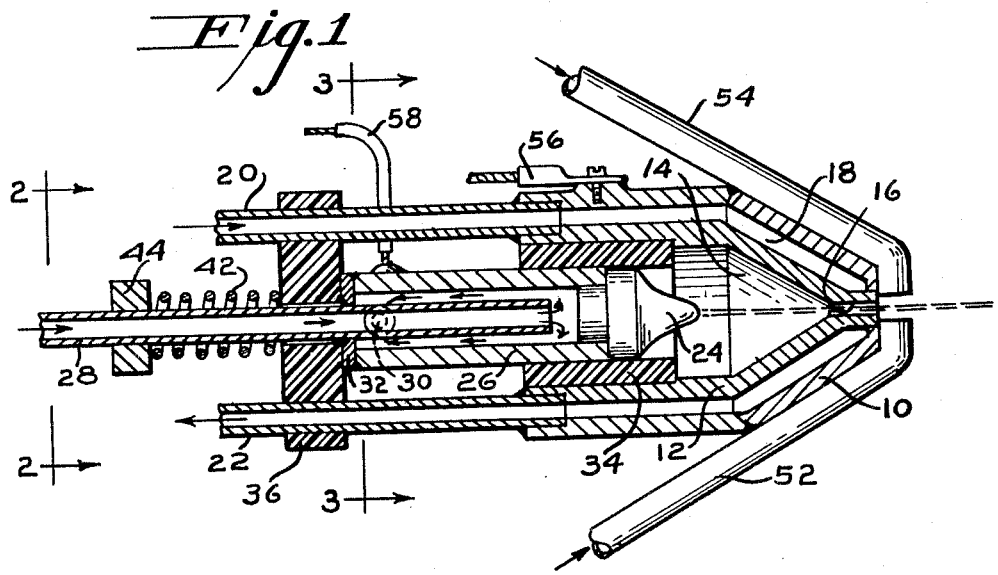
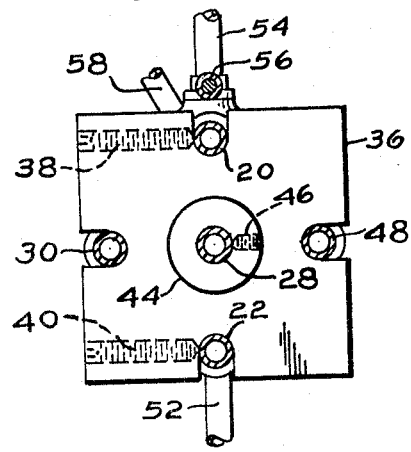
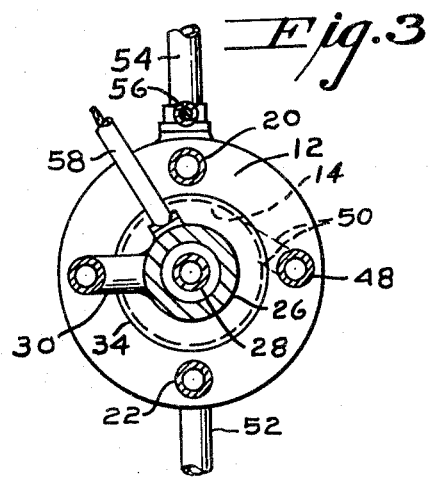
INVENTOR.
ROBERT M. JOHNSON
BY Clarence R. Patty Jr.
ATTORNEY

United States Patent Office 3,174,025
Patented Mar. 16, 1965

3,174,025
PLASMA-JET TORCH
Robert M. Johnson, Smethport, Pa., assignor to Corning Glass Works, Corning, N.Y., a corporation of New York
Filed Dec. 5, 1962, Ser. No. 242,491
2 Claims. (Cl. 219—75)

This invention relates to plasma-jet torches and more particularly to improvements in non-transferable constricted arc torches, but is in no way limited to such applications.

Streams or jets of plasma (which has been defined as consisting of neutral gas, ions and electrons, at high temperatures) have been observed as physical phenomena for many years, for example, in connection with electric arcs. Such streams have been employed to achieve very high temperatures.

Prior art torches for achieving wall-stabilized or constricted arc operation wherein a portion of the arc is surrounded in close proximity with a solid nozzle require good alignment of the stick electrode and the nozzle in order to prolong the useful life of the nozzle as well as the life of the electrode. The nozzle and stick electrode require adequate cooling to prevent damage at arc temperatures. Arc erosion coupled with the fact that cooling of the stick electrode has heretofore been difficult resulted in a short life thereof, requiring frequent electrode changes. These features become especially important in non-transferred arc operation wherein the arc is maintained between a stick electrode and a nozzle electrode.

Some prior art torches have also failed due to deflection of the arc caused by gas turbulance or created by asymmetric current paths causing off-axis nozzle wear. Furthermore, prior art torches were complicated, having many parts and cooling passages as well as complicated starting means, such for example as, capacitive or RF type starters resulting in high initial cost and troublesome and costly maintenance.

One outstanding problem of heretofore known torches is that plasma volume and size has been large, making it very difficult to employ such torches in connection with small parts. For example, in coating applications the coating materials were introduced into the plasma prior to passing through the nozzle orifice causing the orifice to become partially plugged with the coating material due to nozzle cooling and the like, thereby producing an erratic plasma and rapid electrode and nozzle burnout. To avoid this problem, the torches were formed with comparatively large orifices which resulted in a large plasma jet that is unsuitable for small part applications.

An object of this invention is to provide a plasma-jet torch suitable for use in coating small components.

Another object of this invention is to provide a plasma-jet torch having long electrode life.

Still another object is to provide an improved means and method for protecting and cooling the electrodes of the plasma-jet torch to prevent such electrodes from burning out or deteriorating in a short time and to result in a long life torch.

A further object is to provide an improved means and method for injecting substances into plasma streams.

A still further object is to provide means and methods for producing a small cross section and high density plasma stream.

Another object is to provide an improved structure for plasma-jet torches.

Still another object is to provide rapidly interchangeable electrodes for plasma-jet torches.

A further object is to provide an improved non-transferred arc operation plasma-jet torch which can be adapted to automatic starting.

A still further object is to provide a plasma-jet torch which can be formed simply and economically.

Broadly, according to the invention, a non-transferred constricted arc plasma-jet torch is provided comprising a nozzle having an arc chamber and a plasma orifice, an outer torch casing, said nozzle being substantially coaxially disposed within said casing thereby forming a first cooling medium passage therebetween, an electrically insulating liner rigidly and coaxially disposed within said nozzle, a non-consumable electrode, an electrode holder embodying said electrode and cooling medium inlet and outlet means, said inlet and outlet means being disposed relative to said electrode holder to form a second cooling medium passage, said electrode holder being coaxially disposed within said insulating liner for slidable engagement therewith, means for maintaining said electrode holder within said liner in a predetermined desired position relative to said nozzle, means for introducing torch or plasma gas into said arc chamber, electrical terminals electrically connected to said electrode and said nozzle, and means for introducing substances into the plasma stream at the orifice outlet.

Additional objects, features, and advantages of the present invention will become apparent, to those skilled in the art, from the following detailed description and the attached drawing on which, by way of example, only the preferred embodiment of this invention is illustrated.

FIG. 1 is a cross-sectional elevation of a plasma-jet torch of this invention.

FIG. 2 is an end view along 2—2 of FIG. 1.

FIG. 3 is a cross-sectional view along 3—3 of FIG. 1.

Referring to FIG. 1 the plasma-jet torch body comprises outer casing 10 and nozzle 12. Nozzle 12 embodies arc chamber 14 and orifice 16, as well as the main torch body. The annular space between casing 10 and nozzle 12 forms cooling medium passage 18 for cooling said nozzle. A cooling medium from a source not shown is supplied to passage 18 through tube 20 and is removed therefrom through tube 22. An electrode holder assembly is formed by mounting electrode 24 in hollow cylinder 26, and thereafter disposing a cooling medium inlet tube 28 within cylinder 26 to a depth so that the cooling medium will impinge on the back of electrode 24 and then flow between tube 28 and cylinder 26 to outlet tube 30 rigidly mounted on cylinder 26. Cylinder 26 is enclosed by means of plate 32 which is sealed to cylinder 26 and to which, tube 28 is sealed.

A liner 34 of an electrically insulating material is disposed coaxially within the outer portion of nozzle 12. Said liner 34 may extend into said nozzle 12 to and along the tapered portion thereof if desired, as long as the surface area of nozzle 12 surrounding orifice 16 is exposed enabling an arc to be struck as hereinafter described. The cylinder 26 of said electrode holder assembly is coaxially disposed within said liner 34 in a slidable engagement therewith. Said cylinder 26 is axially positioned within said liner by means of electrically insulating block 36, which is rigidly mounted to tubes 20 and 22 and is so disposed that plate 32 of said assembly abuts block 36. Referring to FIG. 2 it is seen that block 36 is held in place by set screws 38 and 40. Plate 32 of said electrode holder assembly is maintained adjacent block 36 by means of spring 42 acting on shoulder 44, which shoulder is rigidly mounted to tube 28 by means of set screw 46.

Referring now to FIG. 3, torch gas for maintaining the plasma enters the torch through tube 48 and enters arc chamber 14 tangentially as shown by dotted lines 50. The gas entering the arc chamber tangentially follows a whirling or vertical path until it flows out orifice 16. It has been found that such tangential entry stabilizes the plasma stream and causes it to be uniform and substantially concentric with orifice 16.

Where the plasma-jet torch is used for applying coating materials to articles, such coating materials may be supplied through tubes 52 and 54 in powder form and in gas suspension. Ideally, the gas in which such coating materials may be suspended is the same as that used for the torch gas; however, any other suitable gas may be used. Tubes 52 and 54 are disposed at opposite sides of the outlet of orifice 16, that is at approximately 180° apart from one another, to introduce the substance equally from opposite side of the plasma stream so that the stream is not deflected. Furthermore, the substance is introduced into the plasma stream where the temperature thereof is high and where it will have sufficient time to become molten before reaching the article to which it is being applied.

Electrical power is supplied to the plasma torch through terminals 56 and 58. Terminal 56 is electrically connected to said nozzle which forms the nozzle electrode and terminal 58 is electrically connected to electrode 24.

The plasma-jet torch described may be conveniently started by applying electrical power to terminals 56 and 58, starting flow of the torch gas into arc chamber 14, and thereafter causing electrode 24 to be moved inward in arc chamber 14 until an arc is struck with the nozzle electrode. A force is applied to shoulder 44 depressing spring 42 against block 36 and causing the electrode assembly and tube 28 to move inward until electrode 24 contacts nozzle 12. The arc is struck, by releasing the force on shoulder 44. After the force on shoulder 44 is released, spring 42 will return the electrode assembly to its predetermined desired position with plate 32 adjacent block 36. Although said torch is illustrated with a manual means for causing said electrode assembly to move inward, it is readily seen that such movement can be effected by mechanical means such as an air cylinder, electrical means such as a solenoid and like means well known in the art, thereby permitting automatic or remote starting.

Electrode 24 is non-consumable except for arc erosion and may be formed of carbon, thoriated tungsten, tungsten, or metals having high melting temperatures. Unlike prior art electrodes, electrode 24 is formed having a comparatively short length to increase the heat transfer therethrough. The length of electrode 24 need be no greater than is necessary to firmly attach it to cylinder 26 and provide a suitable arc striking surface. It has been found that by maintaining the length of electrode 24 small and by flowing the cooling medium directly on the back surface of the electrode, electrode life has been substantially increased.

As heretofore noted, block 36 is rigidly mounted to tubes 20 and 22 by means of set screws 38 and 40. Block 36 may be adjusted by remounting at any desired position along said tubes. Its position is determined by the length of the arc desired between electrode 24 and nozzle 12, since it maintains the electrode holder and consequently electrode 24 at a desired position.

The composition of the cooling medium used for cooling the nozzle and the electrode is not critical and may be any compatible commercial cooling medium such as water or the like, and can be readily selected by one familiar with the art.

The material of electrical insulating liner 34 is not critical and may be any commercial insulating material such as boron nitride, glass, ceramic, or the like and can be readily selected by one familiar with the art.

When the plasma-jet torch of this invention is used for coating applications and the coating material is fed as a powder in gas suspension, the powder suspending gas may contribute to the coating process. For example, when nitrogen is used as the torch gas it, or a similarly ionizable gas, may also be used as the coating material suspending gas, therefore, as the suspending gas emits from tubes 52 and 54 into the plasma stream part of it will also become ionized and combine with the plasma stream. When desired combustible or combustion supporting gases such as oxygen, hydrogen and the like may be used as the suspending gas.

The torch gas must be such that it can be readily ionizable with the electrical potentials employed. Nitrogen is a preferred gas for this purpose, however, argon, helium, neon, krypton, xenon, or the like gases may also be used.

Most inorganic materials such as glass, ceramics, inorganic resinous materials, metals and the like are suitable materials for coating with the plasma torch of this invention.

A typical example of carrying out the present invention may be illustrated by the following. A plasma-jet torch such as heretofore described and having an orifice diameter of 0.062 inch was provided. Electrical power of approximately 1.5 kilowatts (10 amperes) was supplied to the electrical terminals. Nitrogen gas was flowed to the arc chamber at the rate of about 5 cubic feet per hour. In addition, an electrical resistor blank with leads connected thereto was also provided as the article to be coated.

Tubes 52 and 54 of the torch were connected to a powder feeder which fed glass powder in nitrogen gas suspension, at the rate of 1 gram per minute with gas at the pressure of approximately 10 pounds per square inch.

The torch was started by striking an arc between the electrode and the nozzle in the manner heretofore described.

Said resistor was suitably supported and subjected to the plasma stream. A glass coating having a thickness of about 0.015 inch was applied to said resistor in about 6 seconds, thereby, hermetically sealing the resistor.

The small orifice diameter of the plasma torch as well as the novel nozzle and electrode cooling of this invention enables production, in the above example, of a thin, dense plasma stream which could be easily directed to selected areas of small parts such as said resistor. Introduction of the coating material at the outlet of the orifice provided a continuous, uniform and easily controllable stream of coating material.

It has been found that plasma-jet torches having an orifice diameter of about 0.020 inch and less also provide thin, dense plasma streams but have, of course, proportionately lower capacities.

Although the present invention has been described with respect to specific details of certain embodiments thereof, it is not intended that such details be limitations upon the scope of the invention except insofar as set forth in the following claims.

What is claimed is:

1. A plasma-jet torch comprising a nozzle embodying an arc chamber and an orifice, an outer torch casing, said nozzle being substantially coaxially disposed within said casing, thereby forming a first cooling medium passage therebetween, an electrically insulating liner disposed coaxially within a portion of said nozzle, a non-consumable electrode, an electrode holder attached to said electrode and incorporating inlet and outlet means for a cooling medium, said inlet means being coaxially disposed within said holder to direct the flow of said cooling medium at said electrode and to form a second cooling medium passage therebetween, said electrode holder being coaxially disposed within said liner for slidable engagement therewith, means for maintaining said electrode holder within said liner in a predetermined desired position, means for introducing plasma gas into said arc chamber, and electrical terminals electrically connected to said electrode and to said nozzle.

2. A plasma-jet torch comprising a nozzle embodying an arc chamber and an orifice, an outer torch casing, said nozzle being substantially coaxially disposed within said casing thereby forming a first cooling medium passage therebetween, means for supplying a cooling medium to and removing it from said first cooling medium passage, an electrically insulating liner disposed coaxially within a portion of said nozzle, a non-consumable electrode, an electrode holder attached to said non-consumable electrode and incorporating cooling medium inlet and outlet means, said inlet means being substantially coaxially disposed within said holder to direct the flow of a cooling medium at the back of said electrode and to form a second cooling medium passage therebetween, said electrode holder being coaxially disposed within said liner for slidable engagement therewith, means for maintaining said electrode holder within said liner in a predetermined desired position, means for introducing plasma gas into said arc chamber, electrical terminals electrically connected to said electrode and to said nozzle, and means for introducing a substance into the plasma stream.

References Cited in the file of this patent

UNITED STATES PATENTS

| | | |
|---|---|---|
| 2,768,279 | Rava | Oct. 23, 1956 |
| 2,898,441 | Reed et al. | Aug. 4, 1959 |
| 3,010,009 | Ducati | Nov. 21, 1961 |
| 3,083,289 | Munro et al. | Mar. 26, 1963 |